US005137590A

United States Patent [19]

Villagrasa

[11] Patent Number: 5,137,590

[45] Date of Patent: Aug. 11, 1992

[54] PROCESS FOR THE FABRICATION OF A COMPOSITION FORMED BY THERMOCOMPRESSION

[75] Inventor: Enrique Villagrasa, Barcelona, Spain

[73] Assignee: Catalana De Enfeltrados, S.A. "Catensa", Barcelona, Spain

[21] Appl. No.: 390,480

[22] Filed: Aug. 2, 1989

Related U.S. Application Data

[63] Continuation of Ser. No. 48,860, May 12, 1987, abandoned.

[30] Foreign Application Priority Data

May 12, 1986 [ES] Spain .......... 554886

[51] Int. Cl.[5] .......... B32B 31/00

[52] U.S. Cl. .......... 156/62.4; 156/62.8; 156/296

[58] Field of Search .......... 156/62.2, 62.4, 62.6, 156/62.8, 296; 264/109, 112, 121; 425/82.1, 81.1; 366/101, 339

[56] References Cited

U.S. PATENT DOCUMENTS

| | | | |
|---|---|---|---|
| 2,561,043 | 7/1951 | Ayres | 162/20 |
| 3,411,720 | 11/1968 | Jones | 162/26 |
| 4,035,120 | 7/1977 | Eriksson | 156/62.2 |
| 4,132,520 | 1/1979 | De Mets | 264/112 |
| 4,259,024 | 3/1981 | Clasen | 366/339 |
| 4,322,380 | 3/1982 | Bleymaier | 156/62.2 |
| 4,430,001 | 2/1984 | Schurr | 366/101 |
| 4,476,175 | 10/1984 | Forry | 156/62.8 |
| 4,557,882 | 12/1985 | Arnold | 264/112 |
| 4,642,153 | 2/1987 | Lohr | 156/296 |

FOREIGN PATENT DOCUMENTS

| | | | |
|---|---|---|---|
| 0009279 | 1/1977 | Japan | 366/339 |
| 0421871 | 11/1974 | U.S.S.R. | 366/339 |
| 0956175 | 4/1964 | United Kingdom | 156/62.2 |

*Primary Examiner*—Jenna L. Davis

*Attorney, Agent, or Firm*—Cushman, Darby & Cushman

[57] ABSTRACT

Wood fragments are mechanically disintegrated to provide a defibrated material, while avoiding premature agglomeration by avoiding permitting the temperature of the material to rise more than 10° C. as it is being defibrated. The humidity of the defibrated material is reduced, and textile fibres including thermoweldable textile fibres are added to it to provide a composite material. The composite material is made homogeneous by mechanical mixing, with much of the composite material being recycled for further mechanical mixing. The mixed composite material is then pneumatically conveyed through a conduit which branches into a plurality of branches, providing feeds to a battery of lap-forming rollers. The laps thus formed are deposited, superimposed on one another on a conveyor which feeds into a hot-pressing station in which the material is hot-pressed to form a sheet.

4 Claims, 2 Drawing Sheets

PROCESS FOR THE FABRICATION OF A COMPOSITION FORMED BY THERMOCOMPRESSION

This is a continuation of application Ser. No. 07/048,860, filed May 12, 1987 is now abandoned.

BACKGROUND OF THE INVENTION

The present invention relates to a process for manufacturing composite materials from which, after a forming operation by hot pressing, components or panels having improved properties are produced.

The advantages associated with the use of sheets or laminates of composite materials using a mixture of wood and textile fibre are of common knowledge, in particular the production which includes a hot pressing operation of items of a stabilized shape, as opposed to similar items produced from a simple wood agglomerate.

The hot press forming of wood agglomerates encounters major moulding problems, the solution of which cells for a pre-forming stage and, even then, the production of complicated shapes is extremely difficult. Furthermore the resulting product lacks flexibility when using pure agglomerates, and is relatively poor in its thermal and accoustic characteristics.

The substitution of composite material using a wood fibre and a textile fibre mixture, the latter being of any nature, for a simple wood agglomerate has well proven advantages but the manufacturing processes which have been tried or installed to date have been uneconomic and the results have been unsatisfactory.

The diverse mechanical processes for defibrating wood are not readily cost-effective and do not land themselves easily to avoiding the agglomeration of the fibres arising from thė presence of natural resins in the wood itself and which have to be eliminated so as to allow a subsequent satisfactory mixture of the wood fibres with other fibrous material.

Also, it is difficult to produce, when using wood defibration processes, fibres of an average length suitable for mixing with textile fibres for the production of laminates by conventional means.

In view of the above, to obtain an acceptable cost effectiveness, short wood fibres, specifically 2 to 5 mm. have to be produced, and there are not readily suitable for utilization by the conventional processes, which normally require a minimum length of 10 millimeters.

Secondly, the mixing of the wood fibres with the textile fibres must be virtually perfect so as to obtain complete homogeneity in the product and the required characteristics in the final material, utilizing the short wood fibres while avoiding their being broken in the course of manufacturing the sheet or laminate of the composition material.

SUMMARY OF THE INVENTION

The present invention which is the result of length investigation and experimentation, offers a fully cost-effective process ideally suitable for the production of composite boards, using a mixture of defibrated wood and textile fibre ready for forming directly by hot pressing, the process being superior to all known proposed or installed processes having similar objectives.

Figure 1:
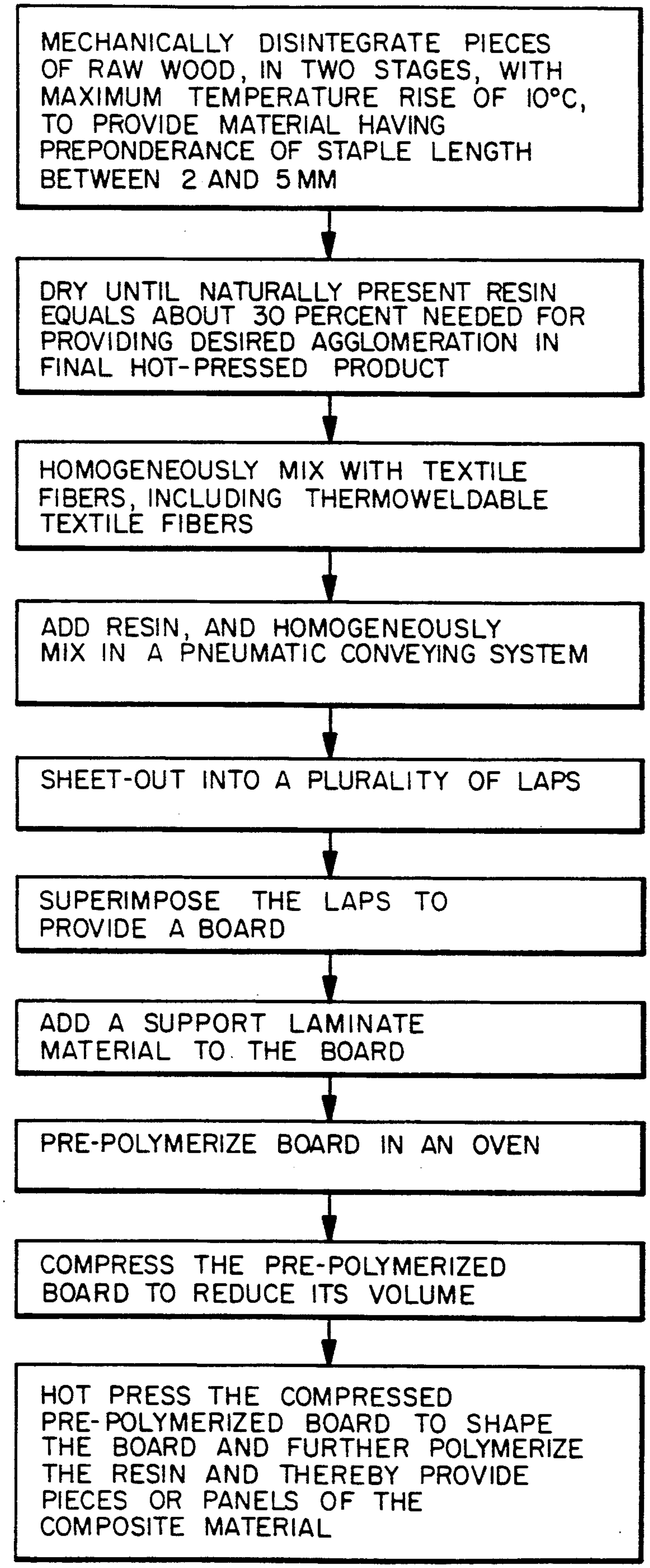
FIG. 1 is a schematic flow diagram of the process for producing compressed pieces or panels of polymerized resin-bonded disintegrated wood fiber material embodying principles of the present invention.
Figure 2:
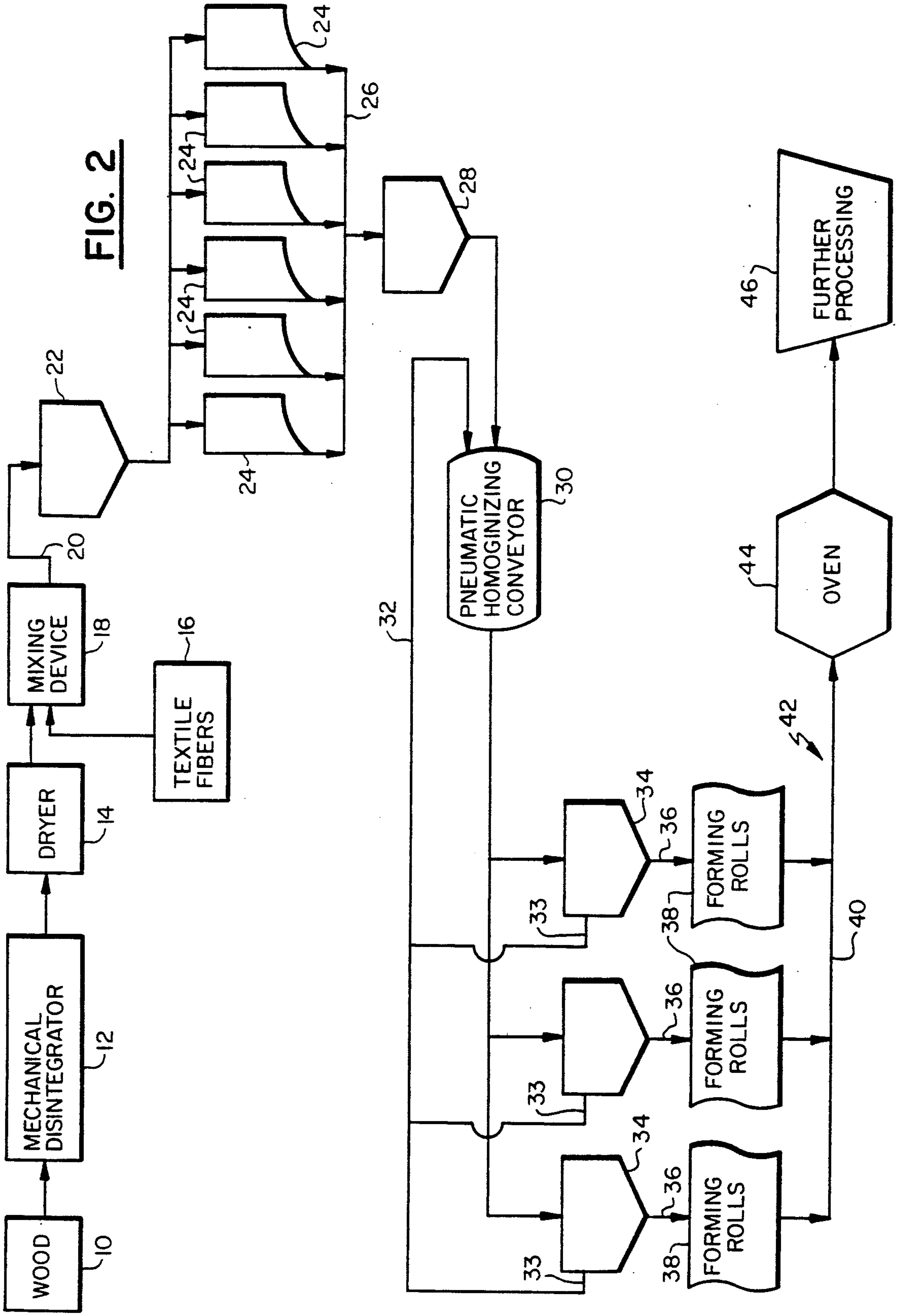
FIG. 2 is a schematic flow diagram of the apparatus for producing compressed pieces or panels of polymerized resin-bonded disintegrated wood fiber material embodying the principles of the present invention.

The process is based on the obtention of wood fibre from the natural wood state without prior treatment of the wood.

The defibration of the wood is carried out, in its basic characteristic, by means of mechanical disintegration, such that the material being treated at no time suffers a temperature rise exceeding 10 degrees Centigrade.

This avoids the formation of agglomerates in the material due to the viscosity of the natural resin present in the wood arising from the increase in temperature and hence binding the wood fibres.

The mechanical treatment of the wood shown schematically at 10, within the above defined thermal parameters is preferably based on the disintegration of pieces of wood in their raw state by means of the mechanical action and exertion of high pressure on conjugate corrugated surfaces, shown schematically at 12 this involving the action of a worm feed compressing the mass of wood silvers onto to an assembly formed by an internally toothed cone section having a rotary movement within a similarly-toothed fixed casing, such that there is a gap of decreasing section starting from the front or entry end towards the rear or exit and where the product leaves and passes to a second disintegration stage in an opposed-plate mill. The essential characteristic of this defibration process is the modest temperature rise of the fibre, with a maximum of 10° C., as mentioned previously.

The defibrated natural wood, with a preponderance of staple length between 2 and 5 mm is then subjected to a drying operation, shown schematically at 14, so as to control precisely the maximum humidity content, retaining the high content of natural resins which can reach an appropriate 30% of the total resin necessary for the subsequent agglomeration of the composite material.

The integration of the desired composite product is obtained by mixing the wood fibres produced by the above process with textile fibres of any particular nature with the inclusion of a percentage of thermoweldable fibres, shown schematically at 16, these assisting in the final consolidation of the material which will take its ultimate form in a hot pressing operation.

A specified proportioning of the component materials including the wood fibres is fed to a special mixer 18, the components materials being deposited onto a conveyor belt which carries them to an elevator belt 20 fitted with spiked studs and which, in turn, lifts the material up to a raised battery of spreader cylinders for an initial homogenizing mixing of the material, returning to the conveyor belt four-fifths of the quantity received, feeding solely one-fifth to a hopper 22 provided with a lower suction device which will subsequently raise the material up to a battery of silos 24 having fitted thereto a system of filling and balanced distribution and extraction by lower rollers, such that all the said silos are feeding evenly at the lower end onto one single conveyor belt 26. This simultaneous and balanced extraction of the material from the different silos, of which the number can be variable, but preferably about six, ensures a first basis of regularity in the mix which will go to make-up the final composite product. To strain this effect, the above-mentioned lower rollers causing the extraction from each silo are mutually geared and are provided with longitudinal projections which are arranged in a discontinuous helicoidal direction and pull out the stored material from the silos in a flow free from irregularity and bunching.

Subsequently, the material issuing from the silos 24 and deposited on the conveyor belt 26, having already reached some degree of homogeneity in the above-described stages, passes to a pneumatic homogenizing conveyor 30, with its initial drop into a hopper 28, with the lower outlet connected to a chamber, which is under the operation of a suction and impulsion fan so arranged that the reception and the dispatch under pneumatic flow of the material mix is carried out without the mix passing through the fan blades and becoming damaged thereby shown schematically at 32. The mix is then injected by means of an air stream, showhn schematically at 32, into the interior of a long tube which has fitted therein suitable strips producing a helicoidal movement of the air stream in the tube, thus providing a complete homogenization of the initial mixture of materials and to which has been added a complementary quantity of resin.

The homogenized mixture obtained at this stage, the integral components of which have remained undamaged due to the use of the above-described pneumatic conveying system, and having a minimum length of 20 meters, eventually arrives at a multiple branching, the initial conduit, there being preferably three such branches, each of which them carry the material to a respective receiving hopper 34 having an outlet 33 at the upper part for the air, which is recirculated, so as to utilize the material in suspension in the said air.

Each receiving hopper 34, having a respective reception and delivery control mechanism, has fitted thereto feed cylinders regulating the volumetric delivery rate of the material, which then falls onto a corresponding conveyor belt 36, carrying it to its corresponding lap-forming pair of rolls 38, being one of a line-each serving one branch of the main pneumatic tube and being adapted to produce a lightweight sheet or lap such that by the superposition of these lightweight sheets or laminates leaving their corresponding pair of rolls in coincidence over the same common conveyor belt 40 collecting the said sheets or laminates, there can be formed by such superposition a board of greater or lesser weight in accordance with the final desired characteristics.

This procedure of forming the final board from a multiplicity of sheets shown schematically at 42, provides a further degree of homogeneity in the product as well as resulting in a better contribution from the higher tensile strength of the lightweight component sheets, this being of particular interest, given the presence of the short staple wood fibres in the mix.

The final stage of preparation is the addition of a support laminate material to the board before it passes through the continuous oven 40 where it receives a simple pre-polymerization to give it some degree of consistency, leaving it ready for cutting into lengths or, if required, compressing it to reduce the volume before transferring it to its final hot pressing operation for definitive polymerization of the resinous products in the board, such further processing being shown schematically at 44, and forming thereby the required shapes having the advantageous characteristics indicated previously and a level of quality and cost effectiveness hitherto unattainable with other processes.

The various stages of operation as described above can be carried out industrially as a continuous process employing available electronic and similar devices, automating and controlling the production from its initial phase through to its finality.

Direct hot pressing methods can be used to produce any configuration of pieces or panels of the composite material, avoiding the problems associated with the hot pressing of simple wood agglomerates, and giving physical characteristics of considerable regularity of optimum quality due to the homogeneity of the material.

The method of manufactured described above, as is usual, can permit the addition of all types of detailed accessories, variations of individual aspects and any factor not affecting the essentially, or altering or modifying the same.

I claim:

1. A process for manufacturing composite material, comprising:

(a) providing a supply of wood fragments;

(b) mechanically disintegrating the wood fragments into defibrated material, preponderantly fibers 2–5 mm long, by providing said supply of wood fragments to a mechanical disintegrator having opposed disintegrating elements and passing the wood fragments between the opposed elements and of the mechanical disintegrator while preventing said defibrated material from raising more than 10° C. in temperature in relation to the temperature of said supply of wood fragments;

(c) adjusting the humidity of said defibrated material, by drying, so that the humidity thereof lies within a given range;

(d) introducing the humidity-adjusted defibrated material into a supply of textile fibres including some thermoweldable textile fibres to provide a supply of composite material;

(e) mechanically mixing said supply of composite material so as to increase the homogeneity thereof and thereafter further mixing said composite material by pneumatic action, by dispatching said composite material, in a bladed fan-driven stream of air, through a long tubular conduit having internal ribs, which cause helicoidal movement of said stream of air, while maintaining the fan which drives said stream of air isolated from said composite material is such a manner as to avoid passing said composite material between blades of said fan; and (f) hot-pressing said composite material so as to agglomerate said composite material into a sheet partly adhered together with resins naturally contained in said wood fragments and partly adhered together by thermowelding of said thermoweldable textile fibres.

2. The process of claim 1, wherein:

mechanical mixing in step (e) is conducted by:

conveying said composite material along on a first conveyor, elevating said composite material from said first conveyor on spiked studs of a second conveyor and thereby feeding the composite material into an elevated battery of spreader cylinders, dividing said composite material into two streams, one containing a major portion of said composite material and another containing a minor portion of said composite material;

recycling said major portion of said composite material to said first conveyor for re-elevation by said second conveyor;

forwarding said minor portion of said composite material, through a feed hopper, which dispenses said minor portion in increments of balanced amount, into each of a plurality of silos;

extracting said composite material from all of said silos and depositing the composite material extracted from said silos onto a third conveyor belt for forwarding the composite material to a place where said further mixing by pneumatic action is to be performed.

3. The process of claim 1, wherein:

in conducting said further mixing by pneumatic action, said composite material is introduced into said long tubular conduit through a hopper.

4. The process of claim 1, wherein:

in conducting said further mixing of step (e), the composite material, while being blown along said long tubular conduit in said stream of air, is separated into a plurality of feed streams by being blown into and along respective ones of a plurality of branches of said long tubular conduit, therefrom into respective hoppers which feed the respective feed streams onto respective conveyors, and by said respective conveyors through respective sets of lap-forming rolls onto a conveyor as a respective plurality of superimposed laps, all to be hot-pressed together and thereby agglomerated into a sheet in step (f).

* * * * *